No. 655,250.  
Patented Aug. 7, 1900.
D. J. LAHAY.
TIRE SEPARATOR.
(Application filed Nov. 18, 1899.)
(No Model.)
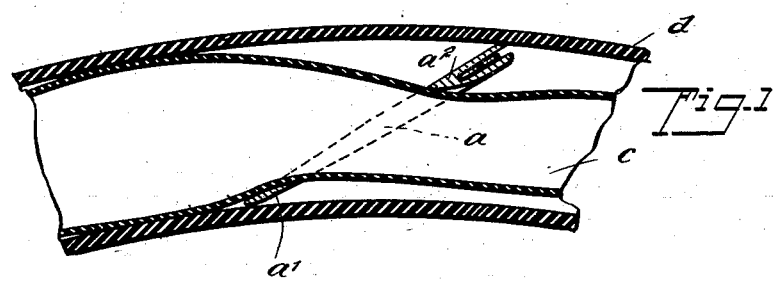
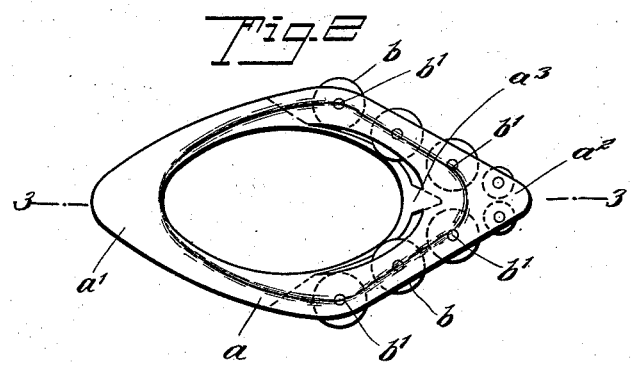
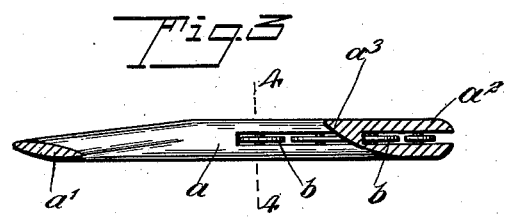
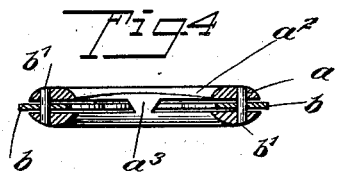
WITNESSES:
INVENTOR
BY
ATTORNEYS.

UNITED STATES PATENT OFFICE.

DELORE JAMES LAHAY, OF NADEAU, MICHIGAN.

TIRE-SEPARATOR.

SPECIFICATION forming part of Letters Patent No. 655,250, dated August 7, 1900.

Application filed November 18, 1899. Serial No. 737,437. (No model.)

*To all whom it may concern:*

Be it known that I, DELORE JAMES LAHAY, a citizen of the United States, and a resident of Nadeau, in the county of Menominee and State of Michigan, have invented a new and Improved Tire-Separator, of which the following is a full, clear, and exact description.

The purpose of this invention is to provide a device for separating the inner tube of pneumatic tires from the outer tube or covering. Ordinarily these two sections of a pneumatic tire adhere to each other, and should it be desired to separate them for the purpose of repair great difficulty is generally experienced. My invention provides a means by which this separation may be easily accomplished.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a sectional view showing the invention in use. Fig. 2 is a plan view of the invention. Fig. 3 is a section on the line 3 3 of Fig. 2, and Fig. 4 is a section on the line 4 4 of Fig. 3.

The device comprises an essentially-elliptical frame $a$, the end $a'$ of which is flattened and disposed at an angle to the general trend of the frame, so as to permit engaging with the inner tube of the tire, as will be fully explained hereinafter.

The opposite end $a^2$ of the frame $a$ is split transversely, so that the rollers $b$ may be placed therein and mounted to turn on axes $b'$, held in the frame, as shown. The peripheries of the rollers $b$ project beyond the frame, and the rollers extend from a point approximately midway the frame to the extremity of the end $a^2$, before mentioned. This end $a^2$ of the frame has a beveled portion $a^3$, disposed approximately in the same direction as the end $a'$ of the frame and for the same purpose as the diagonal or angular disposition of said end $a'$—namely, for facilitating the engagement of the frame with the tire.

As shown in Fig. 1, should it be desired to separate the inner tube $c$ from the outer tube $d$ of the tire the inner tube is drawn upon longitudinally, so as to separate it at its end from the outer tube $d$. Then the tire-separator is introduced between the two tubes with the end $a^2$ outward, so that the inclined or diagonally-disposed end $a'$ is projected ahead to primarily separate the tubes. Now it is clear that the operator may, by alternately compressing and releasing the outer tube $d$, cause the separator to be projected ahead between the two tubes to separate them. The outer tire $d$ should be compressed upon the rollers $b$ of the separator, and owing to the tapering form of the end $a^2$ of the separator the separator will be caused to move ahead, as explained.

Having thus described my invention, I claim as new and desire to secure by Letters Patent—

1. A tire-separator, comprising a frame or body portion capable of encircling the inner tube and provided with antifriction wheels or rollers, for the purpose specified, the separator being movable between the two tubes of the tire to separate them.

2. A tire-separator, comprising an essentially-elliptical frame adapted to encircle the inner tube of the tire, one end of the frame being split, and rollers or wheels mounted in the split end of the frame.

3. A tire-separator, comprising an open elongated frame capable of encircling the inner tire and of moving through the outer tire and having its end portions formed with internal oppositely-disposed bevels, whereby the frame is held diagonally disposed within the outer tire and permitted to move longitudinally of itself through the tire.

4. A tire-separator, formed of an open elongated frame capable of lying diagonally within the outer tire and of moving longitudinally of itself through the outer tire in such diagonal position, the frame encircling the inner tire to separate it.

5. A tire-separator, comprising an open elongated frame, one end portion of which is formed with outer side edges tapering toward each other in essentially the form of a wedge to facilitate moving the frame in the tire, in the manner described.

In testimony whereof I have signed my name to this specification in the presence of two subscribing witnesses.

DELORE JAMES LAHAY.

Witnesses:
RICHARD KINSEL,
BARNEY NADEAU.